United States Patent
Kim et al.

(10) Patent No.: US 9,652,143 B2
(45) Date of Patent: May 16, 2017

(54) APPARATUS AND METHOD FOR CONTROLLING AN INPUT OF ELECTRONIC DEVICE

(71) Applicant: Samsung Electronics Co., Ltd., Gyeonggi-do (KR)

(72) Inventors: Youngho Kim, Gyeonggi-do (KR); Hoshin Lee, Gyeonggi-do (KR); Sangtae Ji, Busan (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 191 days.

(21) Appl. No.: 14/568,288

(22) Filed: Dec. 12, 2014

(65) Prior Publication Data
US 2015/0169167 A1    Jun. 18, 2015

(30) Foreign Application Priority Data
Dec. 12, 2013    (KR) .......................... 10-2013-0154629

(51) Int. Cl.
*G06F 3/0488*    (2013.01)
*G06F 3/0485*    (2013.01)
*G06F 3/0481*    (2013.01)

(52) U.S. Cl.
CPC .......... *G06F 3/0488* (2013.01); *G06F 3/0481* (2013.01); *G06F 3/0485* (2013.01); *G06F 2203/04806* (2013.01); *G06F 2203/04808* (2013.01)

(58) Field of Classification Search
CPC .................................................. G06F 3/0488
USPC ......................................................... 715/784
See application file for complete search history.

(56) References Cited

U.S. PATENT DOCUMENTS

| | | | |
|---|---|---|---|
| 7,844,915 B2 | 11/2010 | Platzer et al. | |
| 2008/0168384 A1* | 7/2008 | Platzer | G06F 3/04845 715/784 |
| 2010/0162181 A1* | 6/2010 | Shiplacoff | G06F 3/0485 715/863 |

(Continued)

FOREIGN PATENT DOCUMENTS

| | | |
|---|---|---|
| EP | 1 517 228 A2 | 3/2005 |
| WO | 2014/046962 A1 | 3/2014 |

OTHER PUBLICATIONS

European Search Report, Dated: Mar. 2, 2017.

*Primary Examiner* — Reza Nabi
(74) *Attorney, Agent, or Firm* — Cha & Reiter, LLC

(57) ABSTRACT

An electronic device and method for the same are disclosed, including a touch device for detecting a touch input, a display unit for displaying screen information, a storage unit for storing a predetermined number of individual contacts to the touch device, and a controller. The controller compares a number of individual contacts with the predetermined number of individual contacts in response to detecting a touch input via the touch device, executes a scrolling of the displayed screen information according to a movement of the touch input when the number of individual contacts of the touch input matches the predetermined number, and when the number of individual contacts of the touch input does not match the predetermined number, executes a gesture-based zoom according to a change in area defined by the individual contacts of the touch input.

10 Claims, 5 Drawing Sheets

(56) References Cited

U.S. PATENT DOCUMENTS

| | | | |
|---|---|---|---|
| 2010/0251167 A1* | 9/2010 | DeLuca | G06F 3/0485 715/786 |
| 2010/0259493 A1* | 10/2010 | Chang | G06F 3/04883 345/173 |
| 2010/0309147 A1* | 12/2010 | Fleizach | G06F 3/04883 345/173 |
| 2011/0037727 A1* | 2/2011 | Lee | G06F 3/0416 345/174 |
| 2011/0074714 A1* | 3/2011 | Ogawa | G06F 3/0485 345/173 |
| 2011/0163968 A1* | 7/2011 | Hogan | G06F 3/04883 345/173 |
| 2012/0096393 A1* | 4/2012 | Shim | G06F 3/0485 715/784 |
| 2012/0127209 A1* | 5/2012 | Yajima | G06F 3/0485 345/684 |
| 2012/0212420 A1* | 8/2012 | Shin | G06F 3/04883 345/173 |
| 2012/0249445 A1 | 10/2012 | Suzuki et al. | |
| 2012/0327009 A1* | 12/2012 | Fleizach | G06F 3/04883 345/173 |
| 2013/0176230 A1* | 7/2013 | Georgiev | G08C 17/02 345/173 |
| 2013/0187860 A1* | 7/2013 | Fredriksson | G06F 3/0485 345/173 |
| 2013/0321284 A1* | 12/2013 | Bello | A61B 6/548 345/173 |
| 2014/0145994 A1* | 5/2014 | Burrough | G06F 3/016 345/173 |
| 2014/0289665 A1* | 9/2014 | Sugiura | G06F 3/04883 715/778 |
| 2014/0310625 A1* | 10/2014 | Pollock | G06F 3/0485 715/767 |
| 2015/0009175 A1* | 1/2015 | Berget | G06F 3/044 345/174 |
| 2015/0143276 A1* | 5/2015 | Luo | G06F 1/1626 715/773 |
| 2015/0169167 A1* | 6/2015 | Kim | G06F 3/0481 715/784 |
| 2015/0177870 A1* | 6/2015 | Nicholson | G06F 3/0418 345/174 |
| 2015/0363038 A1* | 12/2015 | Luo | G06F 3/0488 345/173 |
| 2016/0034738 A1* | 2/2016 | Luo | G06K 9/001 382/125 |

* cited by examiner

APPARATUS AND METHOD FOR CONTROLLING AN INPUT OF ELECTRONIC DEVICE

CROSS-REFERENCE TO RELATED APPLICATION

This application claims priority from and the benefit under 35 U.S.C. §119(a) of Korean Patent Application No. 10-2013-0154629, filed on Dec. 12, 2013, which is hereby incorporated by reference for all purposes as if fully set forth herein.

TECHNICAL FIELD

The present disclosure relates generally to an apparatus and method for controlling a scroll and gesture operation in a portable electronic device equipped with a touch device.

BACKGROUND

An electronic device equipped with a touch device may execute various types of functions based on a touch input. The electronic device executes a scroll function when a single touch input is sensed on a displayed screen, and determines two or more touch inputs as a gesture input, in all cases. According to the conventional art, while a user interacts with an electronic document such as an image or a browser on a touch screen, a scroll function may be executed according to a single touch input, and another operation such as zooming-in/out may be executed according to a multi-touch input involving two or more inputs.

When a plurality of touch inputs are generated, the electronic device unnecessarily and continuously tracks movement of a finger so as to calculate, for example, a scale factor in a zoom operation, and/or execute a scroll or gesture operation in real time based on the calculation. For example, when the number of touch inputs that a portable touch device may simultaneously detect is ten, a user may have difficulty placing ten fingers on the single screen. However, even in this circumstance, the user may easily make a motion of scrolling in one direction. The user motion pattern may thus be more limited when the size of a screen is small. In particular, in a case of a smart phone and a tablet, a limited battery capacity limits the time the terminal maybe utilized. Power may be wasted because of tracking of unneeded or unutilized touch inputs and attendant calculations, which may even cause a problem or input errors. For example, several touch inputs may be unintentionally input causing a scroll and gesture operation, which may constitute an input error or even a malfunction.

SUMMARY

The present disclosure provides an apparatus and method for controlling an electronic device through a method optimized based on the number of touch inputs by taking into consideration a user motion pattern in a portable electronic device equipped with a touch device.

In one aspect of this disclosure, a method for an electronic device is disclosed, including: in response to detecting a touch input on a touch screen, analyzing a number of individual contacts of the touch input. When the number of individual contacts of the touch input corresponds to a predetermined number of individual contacts, the electronic device executes scrolling of a screen displayed on the touch screen, and when the number of individual contacts of the touch input is different from the predetermined number, the device executes gesture-based zoom of the screen displayed on the touch screen.

In another aspect of this disclosure, a method for an electronic device is disclosed, the method including: in response to detecting a touch input to a touch screen, analyzing a number of individual contacts of the touch input, when the number of individual contacts is greater than a predetermined range of the number of individual contacts, scrolling a screen displayed on the touch screen, and when the number of individual contacts is within the predetermined range of the number of individual contacts, detecting whether an area defined by the individual contacts is constant, executing the scrolling when the area is constant, and executing a gesture-based zoom when the area is not constant, wherein the predetermined range includes at least two numbers corresponding to the number of individual contacts, and the at least two numbers are consecutive numbers or non-consecutive numbers.

In another aspect of this disclosure, an electronic device is disclosed, including: a touch device for detecting a touch input, a display unit for displaying screen information of an executed application, a storage unit for storing a predetermined number of individual contacts to the touch device, and a controller. The controller is configured to: in response to detecting via the touch device the touch input, compare a number of individual contacts with the touch device of the touch input with the predetermined number of individual contacts, when the number of individual contacts of the touch input matches the predetermined number, execute a scrolling of the displayed screen information according to a movement of the touch input, and when the number of individual contacts of the touch input does not match the predetermined number, execute a gesture-based zoom according to a change in area defined by the individual contacts of the touch input.

When a plurality of predetermined touch inputs are generated in a portable electronic device, a scroll operation may be executed without analyzing a scale of a touch input. Accordingly, an electronic document may be controlled through a method optimized based on the number of touches without unnecessary calculation even when a plurality of touch inputs are generated.

BRIEF DESCRIPTION OF THE DRAWINGS

The present disclosure will be more apparent from the following detailed description in conjunction with the accompanying drawings, in which.

DETAILED DESCRIPTION

Figure 1:
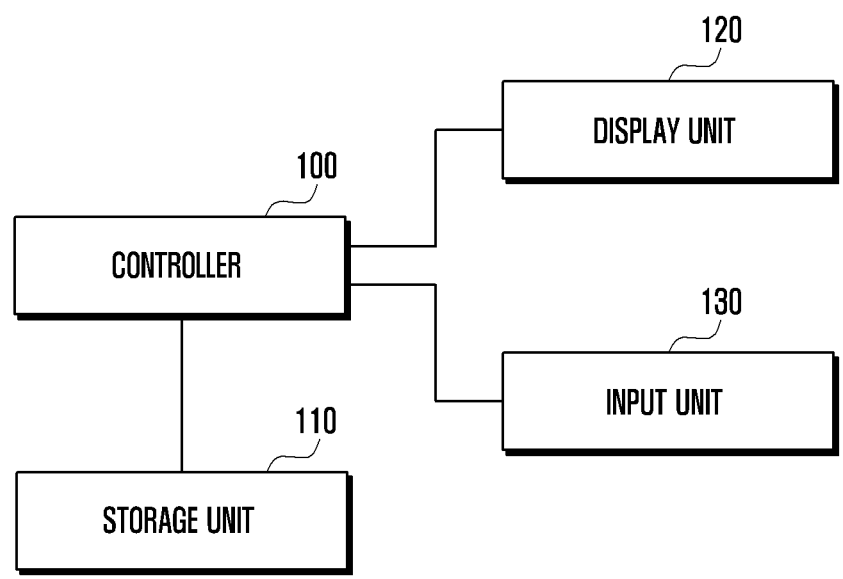
FIG. 1 is a diagram illustrating an example configuration of an electronic device equipped with a touch device.

Hereinafter, various embodiments will be described in detail with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that the descriptions provided that may help understanding the operations provided in association with the various embodiments of the present disclosure, and other descriptions may be omitted to avoid making the subject matter of the present disclosure unclear.

An electronic device equipped with a touch device may detect a plurality of touch inputs. For example, when a user uses applies ten fingers for a touch input, the electronic device may sense the ten finger touches through a touch device. However, the number of touch inputs that is actually used in each application may be less than or equal to ten. Hereinafter, the maximum number of touch inputs which is processable in an application is referred to as "max value." When a single touch input or a predetermined number of touch inputs are sensed, the electronic device detects the touch input as a scroll input, and executes a scroll function on a screen. In addition, when a plurality of touch inputs are sensed and the number of touch inputs is different from the predetermined number of touch inputs, the electronic device determines a touch scale and determines the touch input as a gesture or scroll input.

FIG. 1 is a diagram illustrating a configuration of an electronic device equipped with a touch device. Here, the electronic device may represent various types of digital devices, such as a portable phone, an MP3 terminal, a tablet, a computer, a camera device, TeleVision (TV), and the like.

Referring to FIG. 1, a controller 100 controls general operations of an electronic device. The controller 100 may detect the number of touch inputs when a touch input is sensed. When the detected number of touch inputs is one or a predetermined number, the controller 100 determines that the touch input is a scroll input. Otherwise, the controller 100 determines that the touch input is a gesture input indicating a predetermined function, based on a change in scale of the touch input.

A storage unit 110 may include a program memory that stores an operation program of an electronic device and a program according to an embodiment of the present disclosure, and a data memory that stores information that is processed.

A display unit 120 may display an image photographed under a control of the controller 100. The display unit 120 may be a Liquid Crystal Display (LCD), a Light Emitting Diode (LED), an Organic Light Emitting Diodes (OLDE), or the like. An input unit 130 may detect inputs of an electronic device. Here, the input unit 130 may be a touch panel (a touch device). The input unit 130 may sense a location (coordinate information) of a touch input or a hovering input, provided on/over a touch panel, and output the same to the controller 100. The input unit 130 may be a capacitive touch panel or a resistive touch panel. In addition, the input unit 130 may further include a touch panel which is capable of sensing a pen touch input (for example, an EMR sensor pad or a capacitive sensor pad). Here, the display unit 120 and the input unit 130 may be configured as an integrated touch screen.

Here, when the electronic device is a portable phone, the electronic device may further include a communication unit and sensors.

A communication unit (not depicted herein) may execute wireless communication with a base station or an Internet server, or the like. Here, the communication unit may include a transmitting unit that up-converts a frequency of a transmission signal and amplifies power and a receiving unit that low noise-amplifies a reception signal and down-converts a frequency. In addition, the communication unit may include a modulating unit and demodulating unit. Here, the modulating unit modulates a transmission signal and transfers the modulated signal to the transmitting unit, and the demodulating unit demodulates a signal received through the receiving unit. In this instance, the modulating unit and the demodulating unit may correspond to LTE, WCDMA, GSM, and the like, may also correspond to WIFI, WIMAX, and the like, and may correspond to NFC, Bluetooth, and the like. In general, when the electronic device is a portable phone, the communication unit may include a communication unit of LTE, WIFI, Bluetooth, NFC, or the like.

In addition, the sensor may sense a movement (action) of an electronic device. Here, the sensor may be an acceleration sensor, a terrestrial magnetic sensor, and/or a gyro sensor, or the like, and may sense a tilt and/or a rotational state of an electronic device.

When a touch input is generated in an electronic device having the configuration as described above, the input unit 130 detects a location where the touch is generated, and the controller 100 analyzes touch inputs detected by the input unit 130, and determines the number of touch inputs. In this instance, the storage unit 110 may store the predetermined number of touch inputs to be used to indicate a scroll input, the predetermined number of touch inputs sensed from among a plurality of touch inputs. Hereinafter, the term "predetermined number of touch inputs" (or "predetermined value") may be used to indicate a number of touch inputs to execute a scrolling action for a screen. That is, when the number of touch inputs is one or the predetermined number of touch inputs, the controller 100 may detect the touch input as a scrolling input, and scroll the screen according to a movement of the touch input. Here, the predetermined number of touch inputs is selected from three or more touch inputs.

Therefore, the controller 100 may determine whether to execute scrolling or another gesturally related function when a touch input is sensed from the input unit 130. In this instance, the electronic device may determine the touch input as a scroll input or another gesture-based input, based on the detected number of touch inputs.

When the number of touch inputs is one, the controller 100 detects the touch input as a scroll input, and scrolls a displayed screen on the display unit 120 according to movement of the touch input.

Second, when the number of touch inputs is a value greater than one, the controller 100 compares the value with the predetermined number of touch inputs. In this instance, the predetermined number of touch inputs may be the maximum number of touch inputs (max value) that may be processed in an application, or may be the number of predetermined touch inputs that utilize a large number of calculations, causing unnecessary power consumption when the controller continuously executes the operation of tracking the scale factor of the touch inputs. Alternatively, this may be a case in which scrolling is easily used by taking into consideration a user motion pattern. For example, when four touch inputs are generated, a scroll operation is more natural than a gesture and thus, four may not be used as the predetermined number of touch inputs. When the detected number of touch inputs is identical to the predetermined value for comparison, as a result of the determination, the controller 100 may execute scrolling a screen of the display unit 120.

Third, when the number of touch inputs is not one and is different from the predetermined number of touch inputs, the controller 100 may calculate a scale factor of the touch input. A scale factor may have a value of '1' when one or more touch inputs moves in an identical direction, such as, the horizontal direction, the vertical direction, or a diagonal direction. In this instance, scrolling an electronic document is executed.

Fourth, when one or more touch inputs are sensed, the number of sensed touch inputs is different from the predetermined number of touch inputs, and the touch inputs are increase or decrease in spacing from one another, the scale factor may be greater than 1 or less than 1. In this instance, the controller 100 may determine the touch inputs as a gestural input for another function. For example, the controller 100 may control the screen of the display unit 120 to be zoomed-in for display when a change of the scale factor is greater than 1, and may control the screen of the display unit 120 to be zoomed-out for display when the change of the scale factor is less than 1. Here, the scale factor is determined based on a change in distance between touch coordinates of each touch input, or a change in area of the aggregate touch inputs (e.g., an area defined by the individual contacts of the touch inputs). When the change in distance or area is less than or equal to a predetermined threshold value, the scale factor is determined to be 1, and when the change is greater than the threshold value, the scale factor has a value that is greater than 1 or less than 1.

As described above, the electronic device may determine the number of touch inputs when a touch input is sensed, and detect the touch input to be a scroll or gesture input based on the determined number of touch inputs. In this instance, when a single touch input is sensed, the controller utilizes the single touch input to execute a scroll input. When a plurality of touch inputs are generated, the controller 100 checks whether the number of touch inputs corresponds to the predetermined number of touch inputs, and utilizes the corresponding touch inputs as a scroll input when the number of touch inputs corresponds to the predetermined number of touch inputs. However, when the number of touch inputs is different from the predetermined number of touch inputs, the controller 100 analyzes a scale factor of the touch inputs, and controls the corresponding touch inputs as a scroll input when the scale factor is constant, and controls the corresponding touch inputs as a gesture input (for example, zooming-in or zooming-out) when the scale factor is increased or decreased. Hereinafter, descriptions will be provided by assuming that the gesture input is an input for enlarging or reducing information displayed on a screen.

Figure 2:
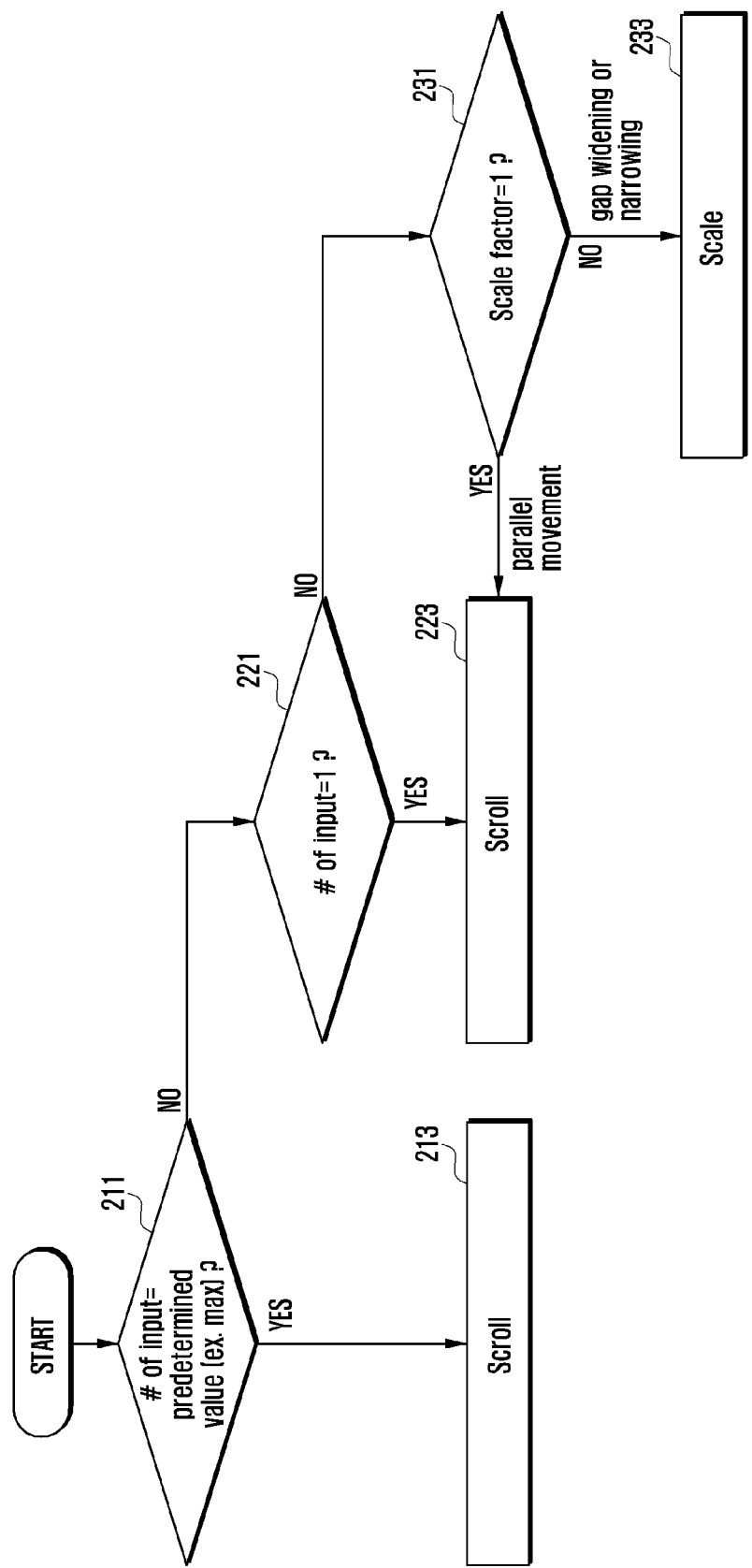
FIG. 2 is a flowchart illustrating an example procedure in which an electronic device processes a touch input according to an example embodiment of the present disclosure.

FIG. 2 is a flowchart illustrating a procedure in which an electronic device processes a touch input according to an example embodiment of the present disclosure.

Referring to FIG. 2, the controller 100 executes an application selected by a user, and displays a result and/or information of an executed application on the display unit 120. Here, the information displayed on the display unit 120 may be displayed in various formats, based on an executed application. The information displayed on the display unit 120 may be formed of a plurality of pages or formed as a single long page and thus, the information may be too large to be displayed on a single screen. To view undisplayed portions of the information, a user may scroll the displayed information by a touch input to the screen indicative of a scroll operation. In addition, the user may view the information (for example, an image, a document, and the like) displayed on the display unit 120 by enlarging or reducing the information with a touch input indicative of a zoom operation.

When the user scrolls the displayed screen or zooms (e.g., enlarges/reduces) the size of the screen, the user may provide one or more touch inputs on the display unit 120 so as to execute the desired scroll or zoom function.

When the touch input is generated, the controller 100 may detect the same through the input unit 130, and may detect the number of touch inputs to determine whether to execute a scrolling function or another gesture-based function. The controller 100 determines whether the detected number of touch inputs is identical to the predetermined number of touch inputs in operation 211. The predetermined number of touch inputs may be the maximum number of touch inputs (the "max value") that is processable in an application, or a number of predetermined touch inputs that utilize a large number of unnecessarily calculations which cause undesired power consumption (e.g., tracking a scale factor of the touch inputs). Alternatively, this may be a case in scrolling is easily identified as the desired function based on motion pattern of the touch inputs. For example, when four touch inputs are generated, a scroll operation is more natural than a gesture than a zoom function, and thus, four may be set as the predetermined number of touch inputs indicating a scroll function. The predetermined number of touch inputs may be determined in advance and stored in the storage unit 110. In this instance, when controller 100 detects that the number of touch inputs is identical to the predetermined number of touch inputs in operation 211, it determines the corresponding touch input as a scroll input in operation 213. That is, when a predetermined number of touch inputs are sensed, the controller 100 determines the touch inputs as a scroll input without analyzing a state of the scale the aggregate touch inputs. In this instance, the controller 100 may not execute calculation of a scale factor even when a plurality of touch inputs are sensed.

In addition, when the plurality of touch inputs are generated, touch distances may be calculated different from the finger touch inputs. For example, when three touch inputs are detected, the controller 100 may determine a scroll direction by tracking movement of a middle touch input of the touch inputs, as opposed to tracking the movement of all three touch inputs. Alternatively, for example, when three touch inputs are generated, the controller 100 may determine a scroll direction by tracking the touch input of the three that has the largest movement.

When the predetermined number of touch inputs are detected as described above in operation 211, the controller tracks the movement of the touch input in operation 213, so as to execute a scroll function on a screen displayed on the display unit 120.

However, when the number of touch inputs is different from the predetermined number of touch inputs in operation 211, the controller 100 may detect whether the number of touch inputs is one in operation 221. When the number of touch inputs is one in operation 221, the controller 100 detects movement of the touch input in operation 223 and executes scrolling of the information displayed on the display unit 120 in accordance with the movement.

In addition, when the number of touch inputs is both greater than one and is different from the predetermined number of touch inputs as determined in operation 231, the controller 100 may calculate a scale factor of the touch input. Here, the scale factor may have a value of '1' when one or more touch inputs move in an identical direction (e.g., when they move in a parallel fashion), such as a horizontal direction, a vertical direction, or a diagonal direction. When a plurality of touch inputs are moved such that they are moved away from or towards one another, the scale factor may be greater than 1 or less than 1. After calculating the scale factor, the controller 100 may check whether the scale factor is 1 in operation 231. Here, the scale factor is determined based on a change in distance between touch coordinates of the touch inputs or a change in area of the aggregated touch inputs. When the change in distance or area is less than or equal to a predetermined threshold value, the scale factor is determined to be 1, and when the change is greater than the threshold value, the scale factor may be determined to have a value that is greater than 1 or less than 1.

When the scale factor is 1, the controller 100 detects that the plurality of touch inputs move uniformly with one another and maintain a relatively constant scale in operation 231, and scrolls information displayed on the display unit 120 in a direction of the movement in operation 223. However, when the plurality of touch inputs are moved such that the distance between them increases or decreased in operation 231 and the scale factor is thus determined to be greater than 1 or less than 1, the controller 100 determines and processes the touch input as a gesture-based input for another function in operation 233. That is, the controller 100 may control information on the screen displayed on the display unit 120 to be, for example, zoomed in or out, based on the scale factor, in operation 233. In this instance, the controller 100 may zoom in on the displayed screen when the scale factor is greater than 1, and may zoom out when the scale factor is less than 1.

Figure 3:
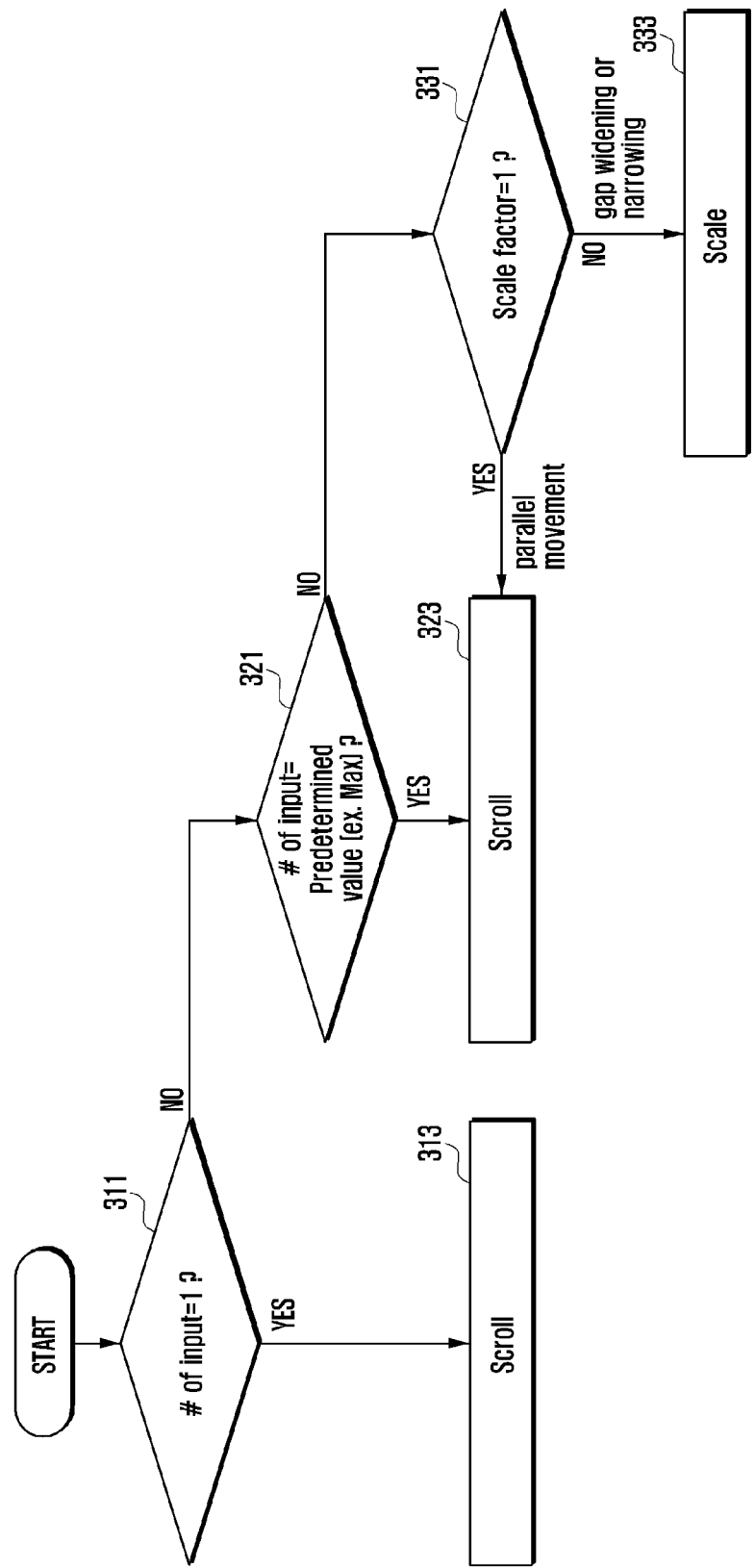
FIG. 3 is a flowchart illustrating an example procedure in which an electronic device processes a touch input according to an example embodiment of the present disclosure.

FIG. 3 is a flowchart illustrating a procedure in which an electronic device processes a touch input according to an example embodiment of the present disclosure.

Referring to FIG. 3, when a touch input is sensed, the controller 100 analyzes the number of touch inputs. When the controller 100 detects that the number of touch inputs is one in operation 311, it may determine the touch inputs to be utilized as a scroll input in operation 313, and executes a scroll operation on the screen of the display unit 120 according to movement of the touch input.

However, when the detected number of touch inputs is greater than one (that is, when a plurality of touch inputs are sensed), the controller 100 may detect whether the number of touch inputs is identical to the predetermined number of touch inputs in operation 321. The predetermined number of touch inputs may be the maximum number of touch inputs (max value) that is processable in an application, or may be the number of predetermined touch inputs that utilizes a large number of processor calculations, thus causing undesired power consumption when, for example, continuously tracking a scale of a multi-touch input. Alternatively, this may be a situation in which scrolling is obviously desired considering a user motion pattern of the multi-touch input. For example, when four touch inputs are generated, a scroll operation is more natural than a gesture-based function indicating, for example, zooming, and thus, four may not be used as the predetermined number of touch inputs. In this instance, when the controller 100 detects that the number of touch inputs is identical to the predetermined number of touch inputs in operation 321, the controller 100 may determine the corresponding touch inputs as a scroll input in operation 323. That is, when the predetermined number of touch inputs are sensed, the controller 100 utilizes the touch inputs to execute a scroll input without analyzing a scale of the aggregated touch inputs. In this instance, the controller 100 may not execute an operation of calculating a scale factor even when a plurality of touch inputs exist.

In addition, when the number of touch inputs is not one, and is different from the predetermined number of touch inputs, the controller 100 may calculate a scale factor of the aggregated touch inputs. After calculating the scale factor, the controller 100 may determine whether the scale factor is one, in operation 331. When the scale factor is 1, the controller 100 detects the same in operation 331 and proceeds with operation 323, scrolling information displayed in the display unit 120 in a direction of movement of the touch inputs. However, when the scale factor is determined to be greater than 1 or less than 1, the controller 100 processes the touch inputs as a gesture-based input in operation 333. That is, the controller 100 may control the displayed screen to zoom in when the scale factor is greater than 1, and may control the displayed screen to zoom out when the scale factor is less than 1, as seen in operation 333.

A difference between the example embodiment of FIG. 3 and the example embodiment of FIG. 2 is that the example embodiment of FIG. 3 first detects whether the number of touch inputs is one. In this instance, when the number of touch inputs is one, a scroll operation is executed. When the number of touch inputs is greater than one, the detected number of touch inputs is compared again with a value set based on a predetermined criterion. Here, when the value set based on the predetermined criterion is defined as the predetermined number of touch inputs, and the predetermined number of touch inputs is the maximum number of touch inputs (e.g., the "max value") that is processable in an application. The predetermined criterion may also be defined as the number of predetermined touch inputs that may utilize a large number of processor calculations and cause undesired power consumption when tracking a scale factor is continuously executed. Alternatively, this may be a case in which scrolling is obviously intended, taking into consideration a user motion pattern of the touch inputs. For example, when four touch inputs are generated, a scroll operation is more natural than a gesture-based operation such as zooming, and thus, four may not be used as the predetermined number of touch inputs. When the detected number of touch inputs is identical to the predetermined value set for comparison as a result of the determination, scrolling may be executed. When the number of touch inputs is not one, and is different from the value set based on the predetermined criterion as a result of the two times of determination, a scale factor is calculated. When the scale factor is one, scrolling may be executed, and when the scale factor is greater than one or less than one, zooming in or zooming out may be executed.

Figure 4:
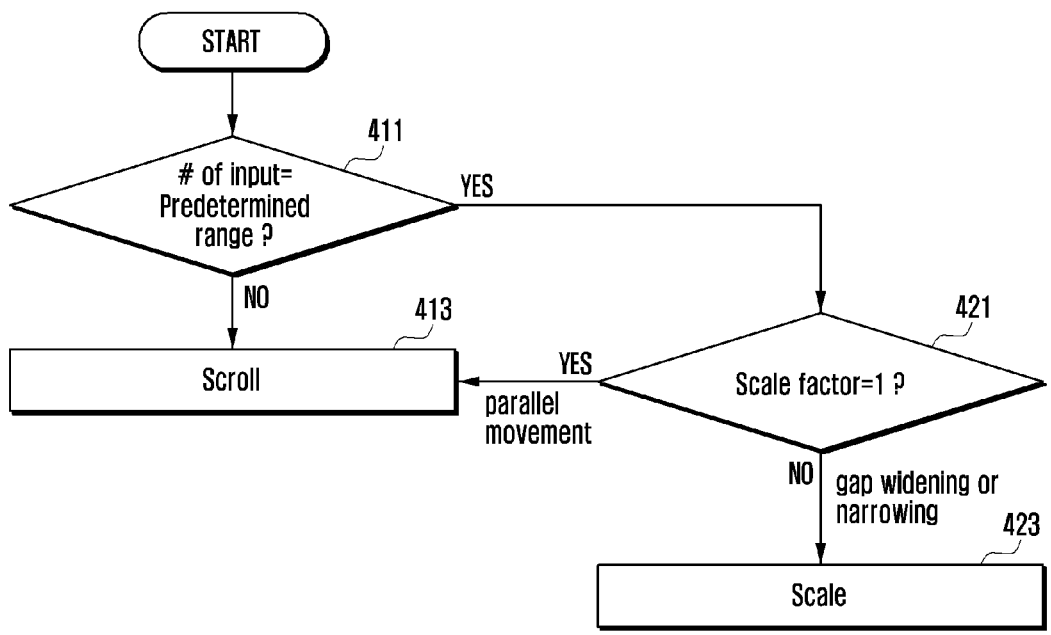
FIG. 4 is a flowchart illustrating an example procedure in which an electronic device processes a touch input according to an example embodiment of the present disclosure.

FIG. 4 is a flowchart illustrating a procedure in which an electronic device processes a touch input according to an example embodiment of the present disclosure.

Referring to FIG. 4, when a touch input is generated, the controller 100 may detect the same through the input unit 130, and may check the number of touch inputs for determining whether to execute scrolling or another gesture-based function. Subsequently, the controller 100 checks whether the number of touch inputs is in a predetermined range of the number of touch inputs, in operation 411. Here, the predetermined range may correspond to a plurality of values corresponding to the number of touch inputs, and may be formed of consecutive numbers (for example, 2 through 7) or inconsecutive numbers (for example, 2 and 5 through 7). In this instance, when controller 100 detects that the number of touch inputs is not within the predetermined range in operation 411, the controller 100 determines the corresponding touch input to be utilized as a scroll input in operation 413. That is, when the number of touch inputs is different from predetermined numbers (for example, when 1 or 6 or a higher number is detected while the predetermined range is 2 through 5), the controller 100 does not analyze a scale of each touch input and determines the same instead as a scroll input. In this instance, the controller 100 may not execute an operation of calculating a scale factor even when a plurality of touch inputs exist.

However, when the number of touch inputs corresponds to a value in the predetermined range (for example, when the number of touch inputs is detected as two while the predetermined range is 2 through 5), the controller 100 determines the corresponding touch inputs as a gesture-based input function, and detects a scale factor of the touch input in operation 421. Here, the scale factor may have a value of one when one or more touch inputs move in an identical direction, such as, a horizontal direction, a vertical direction, or a diagonal direction. When a plurality of touch inputs move so as to distance themselves from one another or approach one another, the scale factor may be greater than 1 or less than 1. After calculating the scale factor, when the scale factor is 1, the controller 100 detects the same in operation 4211, and determines the corresponding touch inputs as a scroll input. However, when the scale factor is different from 1, the controller 100 detects the same in operation 421, and executes a control to zoom the information in or out on a screen displayed in the display unit 120.

FIG. 4 illustrates an example of detecting a touch input as a gesture-based input function when the number of touch inputs within the predetermined range is detected, and detecting a touch input as a scroll input when the number of touch inputs beyond the predetermined range is detected. However, a method may also be used wherein a touch input is detected as a scroll input when the number of touch inputs within the predetermined range is detected, and a touch input is detected as a gesture input when the number of touch inputs beyond the predetermined range is detected, may also be used.

As described above, the example embodiment of FIG. 4 of the present disclosure compares the number of touch inputs and a value in the predetermined range. When the number of touch inputs beyond the predetermined range is detected, the example embodiment executes scrolling, and when the number of touch inputs within the predetermined range is detected, the example embodiment calculates a scale factor, and executes scrolling when the scale factor is one and executes zooming-in or zooming-out when the scale factor is greater than one or less than one.

Alternatively, a modified example embodiment may not detect whether the number of touch inputs corresponds to a value in a predetermined range, but detects instead whether the number of touch inputs corresponds to predetermined values (for example, 1 or 8). When the number of touch inputs corresponds to the predetermined values, the method executes scrolling. Otherwise, the method calculates a scale factor and executes scrolling when the scale factor is 1, and executes zooming-in or zooming-out when the scale factor is greater than one or less than one.

Figure 5:
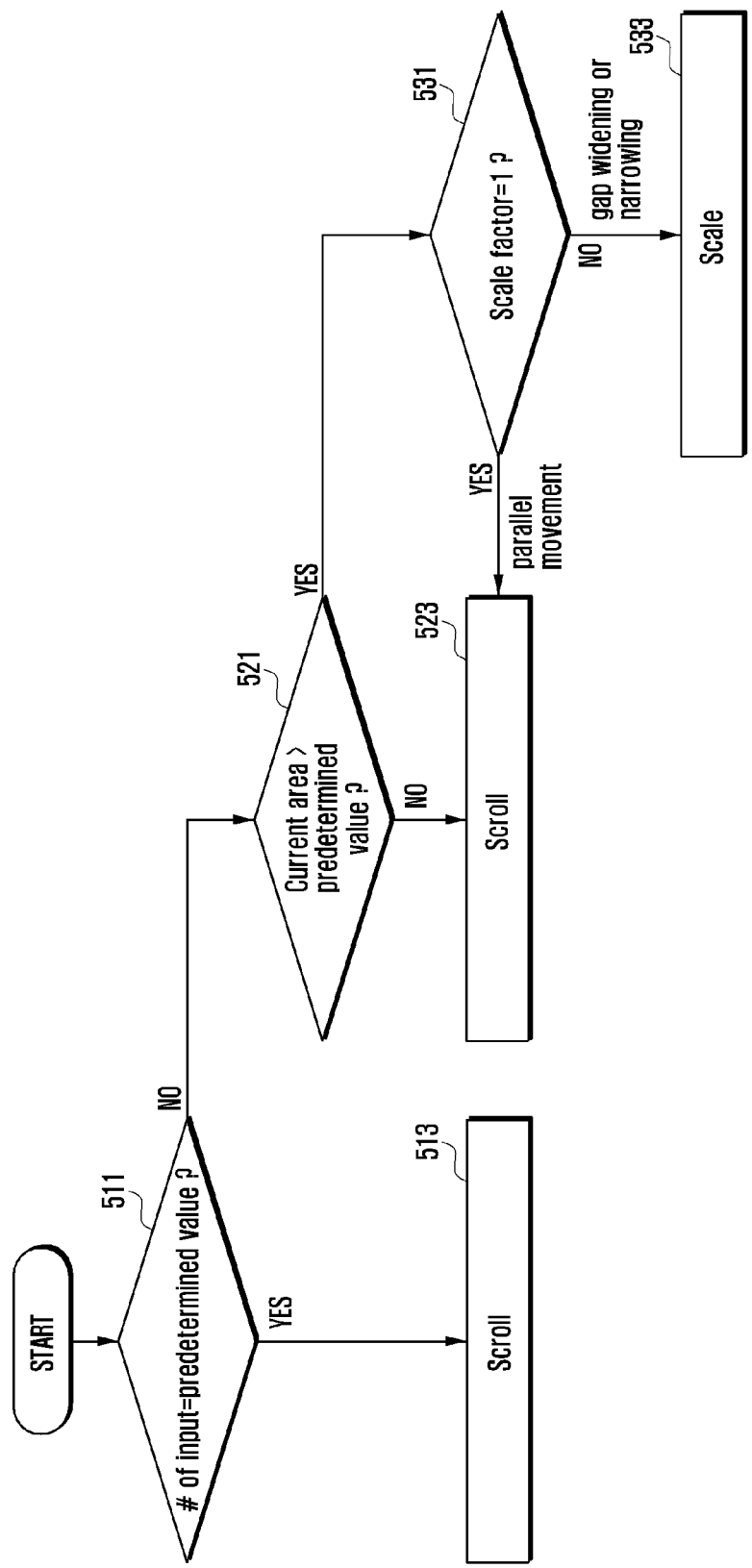
FIG. 5 is a flowchart illustrating a procedure in which an electronic device processes a touch input according to an example embodiment of the present disclosure.

FIG. 5 is a flowchart illustrating a procedure in which an electronic device processes a touch input according to an example embodiment of the present disclosure.

Referring to FIG. 5, when a touch input is generated, the controller 100 may detect the same through the input unit 130, and may check the number of touch inputs for determining whether to execute scrolling or a gesture. Subsequently, the controller 100 compares the number of touch inputs and a value set based on a predetermined criterion from among values greater than one (that is, the predetermined number of touch inputs), in operation 511. Here, when the predetermined number of touch inputs may be the maximum number of touch inputs (e.g., the "max value") that is processable in an application, or may be the number of predetermined touch inputs that may utilize a large number of processor calculation and cause undesired power consumption when tracking a scale factor is continuously executed. Alternatively, this may be a case in which scrolling is easily identified as desirable from a user motion pattern of the touch inputs. For example, when four touch inputs are generated, a scroll operation is more natural than a gesture-based function and thus, four may not be used as the predetermined number of touch inputs. In addition, the predetermined number of touch inputs may or may not have a value for setting a range of a plurality of touch inputs. When the predetermined number of touch inputs correspond to a range of a plurality of touch inputs, consecutive numbers (3 through 5, or the like) or inconsecutive numbers (3 and 5 through 10, or the like) may be used. When the detected number of touch inputs is identical to the predetermined number of touch inputs as a result of the determination, the controller 100 detects the same in operation 511, and determines the corresponding touch input as a scroll input in operation 513. Although not illustrated in FIG. 5, when a single touch input is sensed (that is, when the number of touch inputs is one), the controller 100 may detect the touch input as a scroll input.

However, when the number of touch inputs is different from the predetermined number of touch inputs, in operation 511, the controller 100 calculates an area including the coordinates of the respective touch inputs (e.g., via connecting the coordinates of each of the individual touch contacts for the touch inputs). When the controller 100 detects that calculated size of the touch area is less than or equal to a predetermined threshold value in operation 521, the controller 100 may detect that the corresponding touch input is a scroll input in operation 523. That is, in a situation in which the number of touch inputs is different from the predetermined number of touch inputs, then, when the touch input is detected, the controller 100 may calculate an area of a circular or quadrangular shape that encloses the coordinates of the touch input, and executes scrolling when the calculated area is less than or equal to the predetermined threshold value in operation 521. Accordingly, when the number of touch inputs is different from the predetermined number of touch inputs, the controller 100 may calculate an area of the respective touch coordinates of the touch inputs in association with a movement of the touch inputs, and detect the corresponding input as a scroll input when the calculated area is within a predetermined range of threshold values. Thus, an area of touch inputs is calculated when a plurality of touch inputs are generated, and the corresponding touch inputs are decided to be a scroll input when the calculated area remains constant in size during movement of the touch input.

However, when the number of touch inputs is different from the predetermined number of touch inputs, and the area calculated based on the coordinates of the touch inputs is greater than a predetermined threshold value, the controller 100 determines the corresponding touch inputs to be a gesture-based input function, and determines a scale factor in operation 531. When the scale factor is determined to have a value of one in operation 531, the controller 100 proceeds with operation 523 and executes a scrolling function. Alternatively, if the scale factor does not equal one, the controller 100 processes a gesture-based input function in operation 533. In this instance, the controller 100 may execute a zoom-in function when the scale factor is greater than one, and a zoom-out function when the scale factor is less than one.

As described above, when a single touch input or a predetermined number of touch inputs are sensed while the electronic device senses a touch input in a state in which an application is executed, the electronic device senses the touch input as a scroll input, and executes a scroll function on the screen. When a plurality of touch inputs are sensed, having a number different from the predetermined number of touch inputs, the corresponding touch inputs may be detected as a gesture or scroll input by determining an area and/or a scale of the touch coordinates.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

The embodiments disclosed in the present specifications and drawings were provided merely to readily describe and to help a thorough understanding of the present disclosure but not intended to limit the ambit of the present disclosure. Therefore, it should be construed that all modifications or modified forms drawn by the technical idea of the present disclosure in addition to the embodiments disclosed herein are included in the ambit of the present disclosure.

What is claimed is:

1. A method for an electronic device comprising:
in response to detecting a touch input on a touch screen, detecting a number of individual contacts of the touch input;
when the number of individual contacts of the touch input corresponds to one or a predetermined number of individual contacts, executing scrolling of a screen displayed on the touch screen according to the touch input; and
when the number of individual contacts of the touch input is different from one and the predetermined number, executing gesture-based zoom of the screen displayed on the touch screen according to the touch input,
wherein the predetermined number comprises a range greater than or equal to three and less than or equal to ten.

2. The method of claim 1, further comprising:
detecting whether an area defined by the individual contacts of the touch input changes while the touch input is in contact with the touch screen;
when the area does not change, executing the scroll of the displayed screen; and
when the area does change, executing the gesture-based zoom.

3. The method of claim 2, wherein when the number of individual contacts of the touch input is different from the predetermined number, the method further comprises:
calculating the area formed by connecting coordinates of the individual contacts of the touch input;
when the area changes by less than or equal to a predetermined threshold value during a duration the touch input is detected on the touch screen, executing the scrolling; and
when the area changes by more than the predetermined threshold value during the duration the touch input is detected on the touch screen, executing the gesture-based zoom.

4. The method of claim 3, wherein the gesture-based zoom further comprises:
zooming-in the displayed screen when the area increases; and
zooming-out the displayed screen when the area decreases.

5. A method for an electronic device, comprising:
in response to detecting a touch input to a touch screen, analyzing a number of individual contacts of the touch input;
when the number of individual contacts is greater than a predetermined range of the number of individual contacts, scrolling a screen displayed on the touch screen;
when the number of individual contacts is within the predetermined range of the number of individual contacts, detecting whether an area defined by the individual contacts is constant;
executing the scrolling when the area is constant; and
executing a gesture-based zoom when the area is not constant, wherein the predetermined range includes at least two numbers corresponding to the number of individual contacts, and the at least two numbers are consecutive numbers or non-consecutive numbers.

6. An electronic device, comprising:
a touch device for detecting a touch input;
a display unit for displaying screen information of an executed application;
a storage unit for storing a predetermined number of individual contacts to the touch device; and
a controller for:
in response to detecting via the touch device the touch input, comparing a number of individual contacts with the touch device of the touch input with the predetermined number of individual contacts,
when the number of individual contacts of the touch input matches one or the predetermined number, executing a scrolling of the displayed screen information according to a movement of the touch input, and when the number of individual contacts of the touch input does not match one and the predetermined number, executing a gesture-based zoom according to a change in area defined by the individual contacts of the touch input, wherein the predetermined number comprises a range greater than or equal to three and less than or equal to ten.

7. The electronic device of claim 6, further comprising:
when the area of the touch input is constant, executing the scrolling of the displayed screen information; and
when the area of the touch input changes, executing the gesture-based zoom.

8. The electronic device of claim 7, wherein when the number of individual contacts of the touch input is different from the predetermined number of individual contacts, the controller further:
calculates an area formed by connecting coordinates of the individual contacts of the touch inputs;
executes the scrolling when the area of the touch input changes by less than or equal to a predetermined threshold value during a duration the touch input is detected on the touch device; and
executes the gesture-based zoom when the area of the touch input changes by more than the predetermined threshold value during the duration the touch input is detected on the touch device.

9. The electronic device of claim 8, the controller further:
zooms in the displayed screen information when the area increases; and
zooms out the displayed screen information when the area decreases.

10. The electronic device of claim 6, further comprising a threshold range of individual contacts, wherein the controller further:
when the number of individual contacts is greater than any number within the threshold range, executes the scrolling of the displayed screen information;
when the number of individual contacts is within the threshold range, detects an area defined by the individual contacts of the touch input;
when the area is constant, executes the scrolling of the displayed screen information according to the movement of the touch input; and
when the area is not constant, executes the gesture-based zoom according to a change in the area of the touch input.

* * * * *